United States Patent
Ko

(10) Patent No.: US 8,640,175 B2
(45) Date of Patent: Jan. 28, 2014

(54) MOBILE DEVICE, AV DEVICE AND METHOD OF CONTROLLING THE SAME

(75) Inventor: Sung-jong Ko, Yongin-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 162 days.

(21) Appl. No.: 12/849,245

(22) Filed: Aug. 3, 2010

(65) Prior Publication Data

US 2011/0126231 A1 May 26, 2011

(30) Foreign Application Priority Data

Nov. 24, 2009 (KR) .................. 10-2009-0113847

(51) Int. Cl.
- *H04N 7/18* (2006.01)
- *H04N 5/445* (2011.01)
- *G09G 5/00* (2006.01)

(52) U.S. Cl.
USPC ............... 725/80; 725/37; 725/39; 725/81; 345/156

(58) Field of Classification Search
None
See application file for complete search history.

(56) References Cited

U.S. PATENT DOCUMENTS

| | | | |
|---|---|---|---|
| 7,109,974 B2* | 9/2006 | Kempisty | 345/173 |
| 2003/0073411 A1 | 4/2003 | Meade, II | |
| 2005/0097618 A1* | 5/2005 | Arling et al. | 725/114 |
| 2005/0262535 A1* | 11/2005 | Uchida et al. | 725/80 |

FOREIGN PATENT DOCUMENTS

WO   0059212 A2   10/2000

OTHER PUBLICATIONS

Communication dated Dec. 23, 2010, issued in corresponding European Patent Application No. 10177303.4.
Communication issued Jun. 18, 2012 by the European Patent Office in counterpart European Application No. 10177303.4.

* cited by examiner

*Primary Examiner* — Oschta Montoya
(74) *Attorney, Agent, or Firm* — Sughrue Mion, PLLC

(57) ABSTRACT

Disclosed is a mobile device. The mobile device includes: a display; a user input receiving unit which receives input by a user; a storage unit; a communication unit which communicates with an external AV device via a network; and a controller which receives UI information of the AV device from the AV device through the communication unit to display the UI information on the display, controls the storage unit to store a user setup value of the AV device according to the input of the user, and controls the communication unit to transmit the user setup value to the AV device when the communication unit starts communicating with the AV device.

23 Claims, 8 Drawing Sheets

MOBILE DEVICE, AV DEVICE AND METHOD OF CONTROLLING THE SAME

CROSS-REFERENCE TO RELATED APPLICATION

This application claims priority from Korean Patent Application No. 10-2009-0113847, filed Nov. 24, 2009 in the Korean Intellectual Property Office, the disclosure of which is incorporated herein by reference in its entirety.

BACKGROUND

1. Field

Apparatuses and methods consistent with exemplary embodiments relate to controlling a mobile device and an audio/video (AV) device, and more particularly, to setting up an AV device via a mobile device.

2. Description of the Related Art

Related art AV devices communicate with each other based on an Internet Protocol (IP) network, and exchange contents such as music and images. Home networking allows various household AV devices to connect with each other via a network to share the use of the AV contents.

However, if different AV devices connected via the home network exchange contents or one device controls another remotely, user's involvement becomes necessary. That is, remote control of AV devices connected via the home network needs to be enabled by the user inputting a control signal.

SUMMARY

Exemplary embodiments may address at least the above problems and/or disadvantages and other disadvantages not described above. Also, exemplary embodiments are not required to overcome the disadvantages described above, and an exemplary embodiment may not overcome any of the problems described above.

Exemplary embodiments provide a mobile device which changes a setup of an AV device regardless of time and place, an AV device and a method of controlling the same.

According to an aspect of an exemplary embodiment, there is provided a mobile device including: a display; a user input receiving unit which receives input by a user; a storage unit; a communication unit which communicates with an external AV device via a network; and a controller which receives user interface (UI) information of the AV device from the external AV device through the communication unit to display the UI information on the display, controls the storage unit to store a setup value of the AV device according to the input by the user, and controls the communication unit to transmit the setup value to the AV device when the communication unit starts to communicate with the external AV device.

The controller may receive UI information about a setup menu of the AV device from the AV device.

The setup menu may include at least one of initial setup, image quality control, audio control, time setup, channel control, and media file management of the AV device.

The AV device may output an image and a sound based on a broadcasting signal having a plurality of channels, and the controller may receive electronic program guide (EPG) information about the channels along with the UI information of the AV device from the AV device.

The display may display graphical user interface (GUI) generated on the basis of the UI information from the AV device therein.

The mobile device may receive UI information of each of a plurality of AV devices from the AV devices.

According to another aspect of an exemplary embodiment, there is provided an AV device controlled by a UI, the AV device including: a communication unit which communicates with an external mobile device via a network; a signal processor which processes a user setup value via the UI; and a controller which transmits UI information of the AV device to the mobile device through the communication unit, and processes a user setup value when receiving the user setup value using the UI information of the AV device from the mobile device.

The AV device may further include a storage unit which stores a preset value corresponding to at least one setup item, and the controller may compare the user setup value from the mobile device with a preset value of a setup item corresponding to the setup value stored in the storage unit and updates the preset value.

The AV device may further include a display and a signal receiving unit which receives a broadcasting signal having a plurality of channels, and the signal processor may process a broadcasting signal received by the signal receiving unit, and the controller may control the signal receiving unit to receive a broadcasting signal of one selected among the channels by input by a user and may control the signal processor to process the received signal to be displayed on the display.

The controller may transmit EPG information about the channels along with the UI information of the AV device to the mobile device.

The UI information may be UI information about a setup menu of the AV device.

The setup menu may include at least one of initial setup, image quality control, audio control, time setup, channel control, and media file management of the AV device.

According to another aspect of an exemplary embodiment, there is provided a method of controlling a mobile device which includes a display and is capable of communicating with an external AV device via a network, the method including: receiving UI information of the AV device from the AV device; generating the UI information into GUI and displaying the GUI on the display; receiving a setup value of the AV device according to input by user through the GUI and storing the value in a storage unit; and transmitting the setup value of the AV device to the AV device when starting to communicate with the AV device through a communication unit.

According to another aspect of an exemplary embodiment, there is provided a method of controlling an AV device which is capable of communicating with an external mobile device via a network, the method including: transmitting UI information of the AV device to the mobile device; receiving a user setup value through the UI information from the mobile device; and processing the user setup value.

The method may further include storing a preset value corresponding to at least one setup item in a storage unit; and comparing the user setup value with a preset value of a setup item corresponding to the setup value stored in the storage unit and updating the preset value.

BRIEF DESCRIPTION OF THE DRAWINGS

The above and/or other aspects will become more apparent by describing certain exemplary embodiments, with reference to the accompanying drawings, in which.

DETAILED DESCRIPTION OF EXEMPLARY EMBODIMENTS

Figure 1:
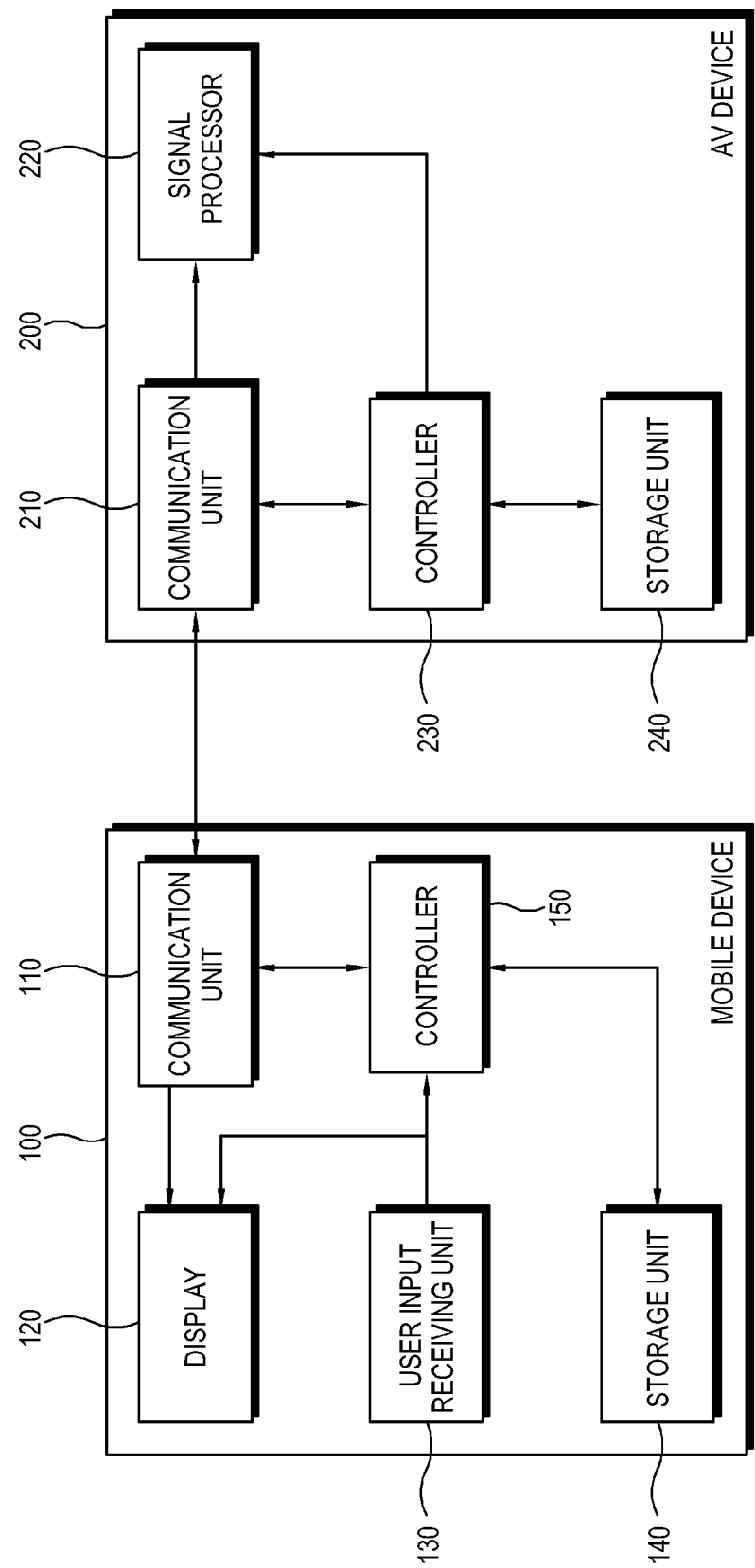
FIG. 1 is a control block diagram of a mobile device and an AV device according to an exemplary embodiment.

Certain exemplary embodiments are described in greater detail below with reference to the accompanying drawings.

In the following description, like drawing reference numerals are used for the like elements, even in different drawings. The matters defined in the description, such as detailed construction and elements, are provided to assist in a comprehensive understanding of exemplary embodiments. However, exemplary embodiments can be practiced without those specifically defined matters.

Figure 2:
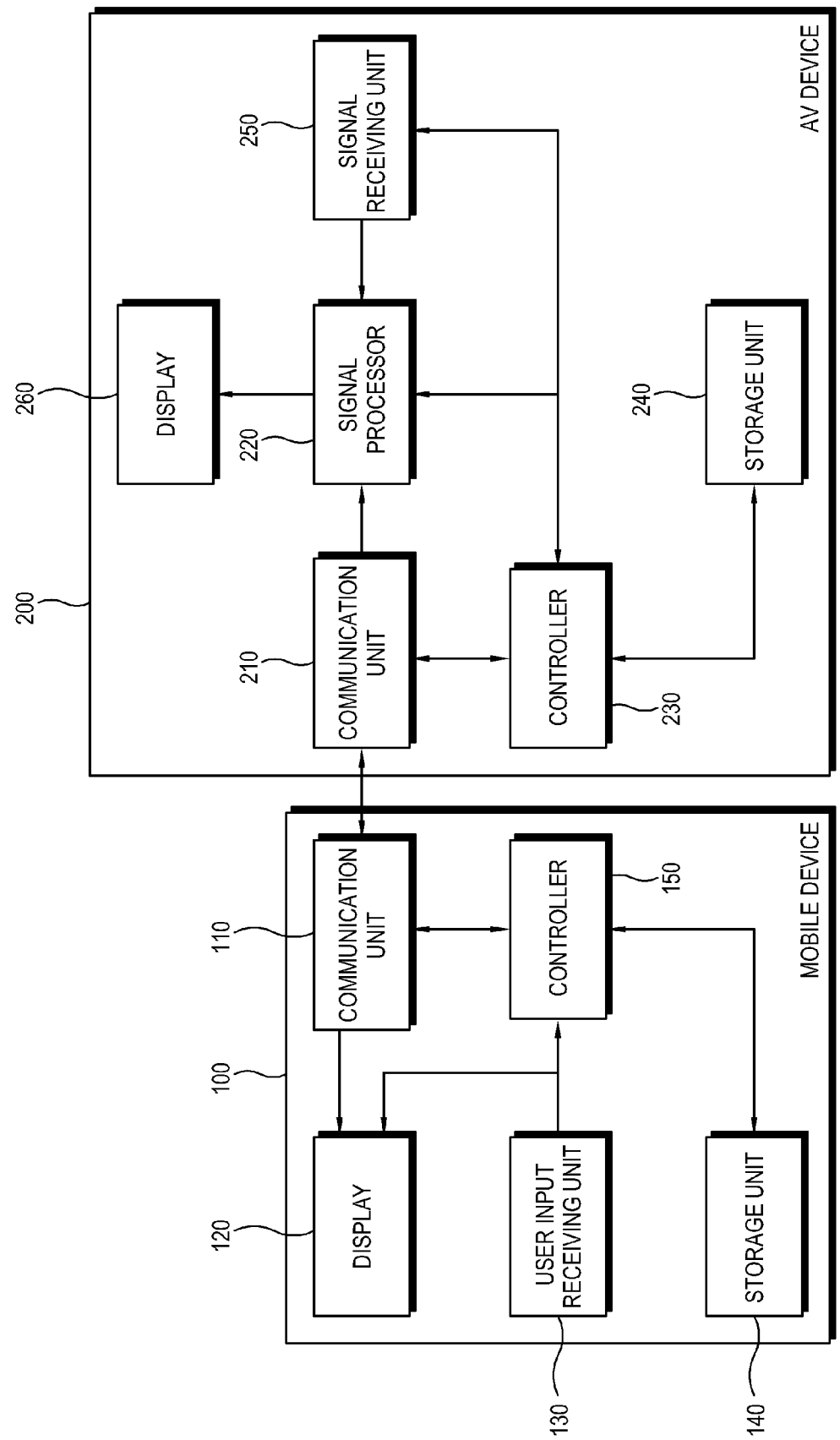
FIG. 2 is a control block diagram of a mobile device and an AV device according to an exemplary embodiment.

FIGS. 1 and 2 illustrate a control block diagram of a mobile device and an AV device according to an exemplary embodiment.

As shown in FIG. 1, a mobile device 100 includes a communication unit 110, a display 120, a user input receiving unit 130, a storage unit 140, and a controller 150.

The mobile device 100 is portable and includes any type of electronic devices which are capable of communicating via network, such as, for example, portable personal computers (PC) including netbooks, smartbooks, notebooks, or tablet PCs, a personal digital assistant (PDA), a handheld game console, a portable multimedia player (PMP), and/or a mobile phone.

The communication unit 110 communicates with an AV device 200, disposed externally to the mobile device 100, via a network. The communication unit 110 may communicate with the AV device 200 via a wired or wireless network, and, accordingly, may include communication protocols for a wireless local area network (WLAN) in a broad aspect. Further, the communication unit 110 may include communication modules corresponding to various communication methods and standards, such as, for example, Bluetooth, Wi-Fi, Zigbee, IR communication, RF communication, and other appropriate communication methods and standards.

The communication modules carry out communications according to various home network communication standards. For example, the communication modules may conduct communications according to digital living network alliance (DLNA) standard. The DLNA allows a wired/wireless network to share digital contents, such as, for example, music, photos, and videos, stored in the electronic devices, such as computers, home appliances, and portable devices.

The communication unit 110 transmits or receives audio, image and UI information and various control signals to and from the AV device 200.

The display 120 displays the UI information of the AV device 200 input via the communication unit 110. The display 120 may include a liquid crystal panel having a liquid crystal layer, an organic light emitting panel having a light emitting layer of an organic material, and a plasma display panel.

The user input receiving unit 130 receives an input signal entered by a user with respect to UI of the AV device 200 displayed on the display 120. The user input receiving unit 130 receives input signals entered by a user via a user input unit provided as buttons on the mobile device 100, a wired or wireless remote control, or a touch panel of the display 120 of the mobile device 100.

The storage unit 140 stores a user setup value of the AV device input by a user to the user input receiving unit 130 through the UI of the AV device 200.

The controller 150 receives the UI information of the AV device 200 from the AV device 200 through the communication unit 110 to display the VI information on the display 120, controls the storage unit 140 to store the user setup value of the AV device 200 according to the user's input, and controls the communication unit 110 to transmit the stored user setup value to the AV device 200 when the communication unit 110 starts communicating with the AV device 200.

The controller 150 controls the communication unit 110 to start communicating with the AV device 200 when it is detected that the mobile device 110 joined the network via a wired network when the communication unit 110 is physically connected with the AV device 200, for example, through a cable. Further, the controller 150 controls the communication unit 110 to start communicating with the AV device 200 when the communication unit 110 is connected to a wireless network through a wireless network relay device.

Accordingly, when the communication unit 110 starts communicating with the AV device 200, the controller 150 controls the communication unit 110 to transmit the user setup value stored in the storage unit 140 to the AV device 200.

The mobile device 100 may receive the UI information of a plurality of AV devices from the AV devices. Accordingly, a single mobile device 100 can change a setup of each of the plurality of AV devices using the UI of the AV devices.

When the mobile device 100 of an exemplary embodiment receives the UI information of an AV device 200 from the AV device 200, the mobile device 100 has the UI information to control the AV device 200. A user stores a user setup value of the AV device 200 using the UI of the AV device 200 received in advance by the mobile device 100 regardless of time and place and, when the mobile device 100 starts communicating with the AV device 200, transmits the stored user setup value to the AV device 200. Accordingly, a user can change a setup of the AV device 200 regardless of time and place.

As shown in FIG. 1, an AV device 200 according to an exemplary embodiment includes a communication unit 210, a signal processor 220, and a controller 230.

The AV device may include any type of audio/image output device which is capable of communicating with an external device via a network, for example, a television (TV), a digital TV (DTV), a PC, a personal video recorder (PVR), a digital video disc (DVD) device, a blu ray disc (BD) device, an audio component, an MP3 player, a handheld game console, and a portable multimedia player (PMP).

The communication unit 210 communicates with the mobile device 100, disposed externally to the AV device 200, via a network.

The communication unit 210 may communicate with the mobile device 100 via a wired or wireless network, and, accordingly, may include communication protocols for a WLAN in a broad aspect. Further, the communication unit 210 may include communication modules corresponding to various communication methods and standards, such as, for example, Bluetooth, Wi-Fi, Zigbee, IR communication, RF communication, etc. The communication modules may carry out communications according to various home network communication standards. For example, the communication modules may conduct communications according to the DLNA standard.

The communication unit 210 transmits or receives audio, image and UI information and various control signals to and from the mobile device 100.

The signal processor 220 processes a user setup value entered by a user through a UI of the AV device 200.

The UI of the AV device 200 may include any type of setup item to control the AV device 200. Thus, when receiving a user setup value for a setup item through the UI from a user, the signal processor 220 processes the user setup value to change a setup of an item corresponding to the user setup value.

A setup item to control the AV device 200 corresponds to an item of a setup menu, e.g., initial setup, image quality control, audio control, time setup, channel control, media file management, etc.

When receiving a user setup value entered by a user through a UI corresponding to one of the setup items of the AV device 200, the signal processor 220 processes the user setup value to change a setup of an item corresponding to the user setup value entered by a user.

For example, when receiving a user setup value to add or delete a preferred channel entered by a user through a UI corresponding to a channel control menu of the AV device 200, the signal processor 220 processes the user setup value to change the setup to add or delete the preferred channel to or from the AV device 200.

For example, when receiving a user setup value to change white balance or chroma entered by a user through a UI corresponding to an image quality control menu of the AV device 200, the signal processor 220 processes the user setup value to change white balance or chroma of the AV device 200 to the user setup value entered by a user.

For example, when receiving a user setup value to change volume by a user through a UI corresponding to an audio control menu of the AV device 200, the signal processor 220 processes the user setup value to change the volume of the AV device 200 to the user setup value entered by a user.

Setup items controlled through the UI are described in greater detail below.

The signal processor 220 may include an image and/or audio signal processor which processes an image and/or audio signal which the AV device 200 receives from the outside or which is already stored to be output by the AV device 200. The AV device 200 may further include an output unit (not shown) to output an image and/or audio signal processed by the signal processor 220.

If the AV device 200 includes a TV, the signal processor 220 may process a broadcasting signal input from the outside.

The controller 230 transmits the UI information of the AV device 200 to the mobile device 100 through the communication unit 210 and, when receiving a user setup value entered by a user using the UI information of the AV device 200 from the mobile device 100, controls the signal processor 220 to process the user setup value entered by the user.

The AV device 200 may further include storage unit 240 storing a preset value corresponding to at least one setup item.

When receiving a user setup value entered by a user using the UI information of the AV device 200 from the mobile device 100, the controller 230 compares the received user setup value with the preset value stored in the storage unit 240. If the received user setup value is different from the preset value, the preset value is updated in accordance with the user setup value entered by the user. For example, to update the reset value, the controller 230 controls the signal processor 220 to process the user setup value entered by the user so that the setup of the AV device 200 is changed based on the received user setup value.

According to an exemplary embodiment illustrated in FIG. 2, if the AV device 200 includes at least one of a TV, a DTV, or the like, the AV device 200 may include a display 260 and a signal receiving unit 250 receiving broadcasting signals with a plurality of channels. The controller 230 controls the signal receiving unit 250 to receive a broadcasting signal of one of the channels selected by an input of a user and controls the signal processor 220 to process the received signal to be displayed on the display 260.

For example, the signal receiving unit 250 receives broadcasting signals with a plurality of channels and may include a broadcasting signal tuning unit (not shown).

For example, the display 260 displays a broadcasting signal processed by the signal processor 220. Further, the display 260 displays an image signal processed by the image and/or audio signal processor (not shown) of the signal processor 220.

The display 260 may include a liquid crystal panel having a liquid crystal layer, an organic light emitting panel having a light emitting layer of an organic material, a plasma display panel, etc.

Figure 3:
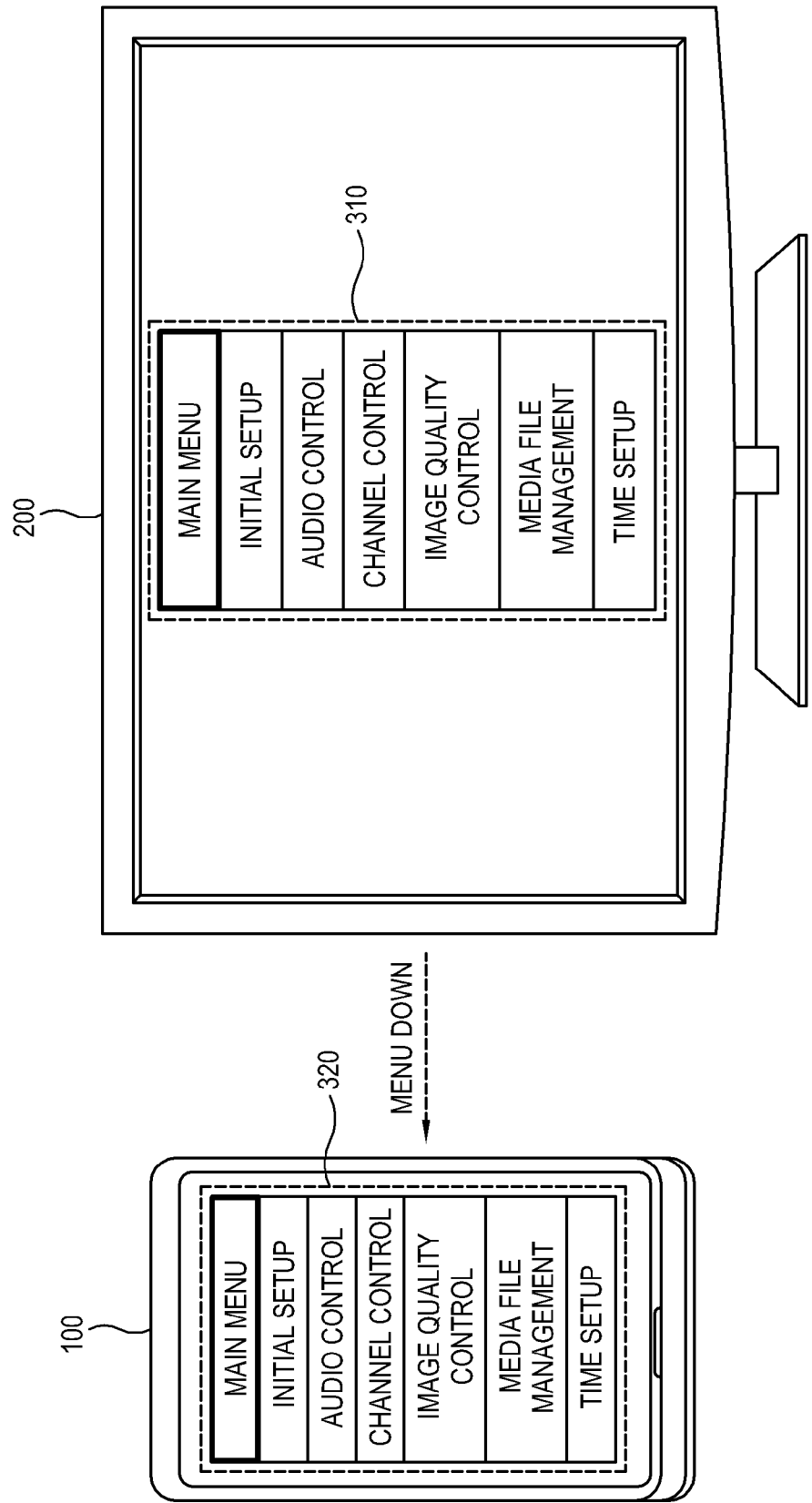
FIG. 3 illustrates a mobile device receiving UI information of an AV device according to an exemplary embodiment.

FIG. 3 illustrates a mobile device 100 receiving the UI information of an AV device 200 according to an exemplary embodiment.

As shown in FIG. 3, a mobile device 100 receives the UI information displaying a UI menu 310 which controls an AV device 200 from the AV device 200. The mobile device 100 generates a GUI 320 from the UI information displaying the menu 310 of the AV device 200 and displays the GUI 320 on a display 120 of the mobile device 100.

A user manipulates the mobile device 100 displaying the GUI 320 corresponding to the menu 310 of the AV device 200 to set up a setup value of the menu 310 of the AV device 200.

According to an exemplary embodiment shown in FIG. 3, a main menu of the UI displayed on the display 260 of the AV device 200 includes initial setup, audio control, image quality control, time setup, channel control, media file management, etc. For example, the UI of the AV device 200 may display all of the setup items which control the AV device 200.

The mobile device 100 receives UI information displaying all of the setup items to control the AV device 200 from the AV device 200, generates a GUI 320 corresponding to the UI information, and displays the GUI 320, which is the same as the UI menu 310 displayed by the AV device 200, on the display 120 of the mobile device 100.

Thus, with the mobile device 100 receiving the UI information displaying a menu 310 to control the AV device 200, a user can input a user setup value through the GUI according to the received UI menu 310 of the AV device 200.

Accordingly, a user can carry the mobile device 100 receiving UI information displaying a menu 310 to control the AV device 200. Accordingly, when a user leaves the network with the mobile device 100, the user can input a new user setup value using the mobile device 100 through the GUI 320 corresponding to the UI menu 310 of the AV device 200 generated in the mobile device 100, regardless of time and place. The input user setup value may be stored in the storage unit 140 of the mobile device 100.

When the user carries the mobile device 100 to the network location where the AV device 200 is present, the communication unit 110 of the mobile device 100 is connected to a wired network physically via a cable or to a wireless network via a wireless network connection manager. The controller 150 of the mobile device 100 transmits the stored user setup value to the AV device 200.

The controller 230 of the AV device 200, receives the user setup value, and compares the received user setup value with a preset value corresponding to a setup item stored in the storage unit 240. If the received user setup value is different from the preset value, the signal processor 220 processes the user setup value to change a setup of the AV device 200 in accordance with the received user setup value.

Figure 4:
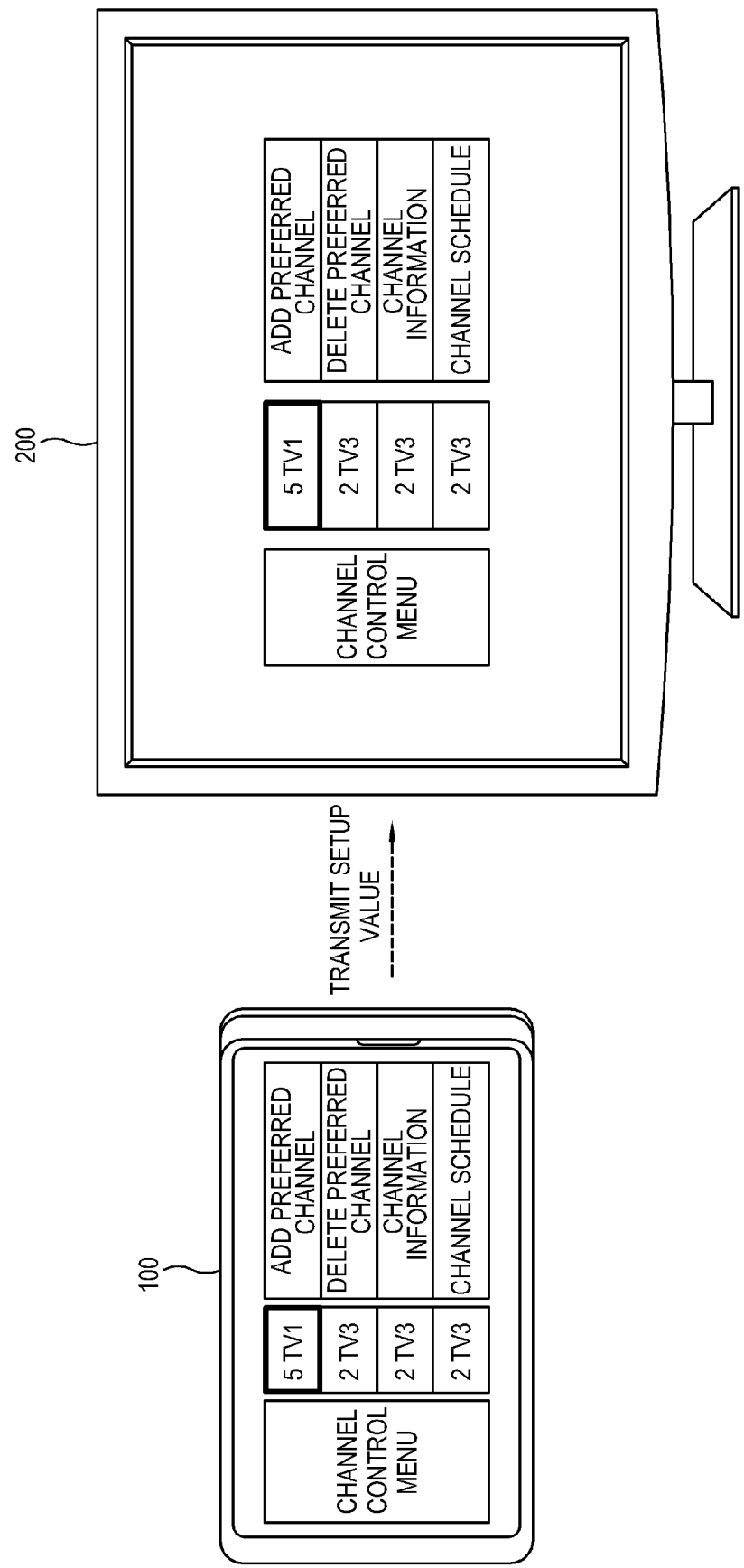
FIG. 4 illustrates a mobile device displaying a channel control menu according to an exemplary embodiment.

FIG. 4 illustrates a mobile device displaying a channel control menu selected on the GUI 320 corresponding to the menu 310 displayed in FIG. 3 according to an exemplary embodiment.

As described with reference to FIG. 3, the mobile device 100 receives the UI information of a menu 310 to control the AV device 200. The mobile device 100 displays a GUI 320 displaying a channel control menu corresponding to the menu 310 of the AV device 200. A user inputs a user setup value to add, delete, or change a preferred channel using the GUI displaying the channel control menu of the AV device 200 displayed by the mobile device 100. When a user setup value is input by the user, the controller 150 of the mobile device 100 stores the user setup value in the storage unit 140.

When the user returns to a network location where the AV device 200 is present, the communication unit 110 of the mobile device 100 may be connected to a wired network physically via a cable or to a wireless network via a wireless network connection manager. The controller 150 of the mobile device 100 transmits the user setup value to add, delete or change the preferred channel to the AV device 200.

The controller 230 of the AV device 200 receives the user setup value and compares the user setup value with a preset value corresponding to a channel control menu stored in the storage unit 240. If the user setup value is different from the preset value, the signal processor 220 processes the user setup value to change a setup of the AV device 200, as for example, to add, delete, or change a preferred channel, in accordance with the user setup value.

In a similar manner, a user may input new user setup values for initial setup, image quality control, audio control, time setup, and/or media file management of the AV device 200 using the mobile device 100, and the input user setup values may be stored in the mobile device 100. When the mobile device 100 starts communicating with the AV device 200, the stored user setup values are transmitted to the AV device 200. The AV device 200 receives the user setup values, compares the user setup values with the preset values, and processes the received user setup values to reflect the setup of the AV device corresponding to the received user setup values.

Figure 5:
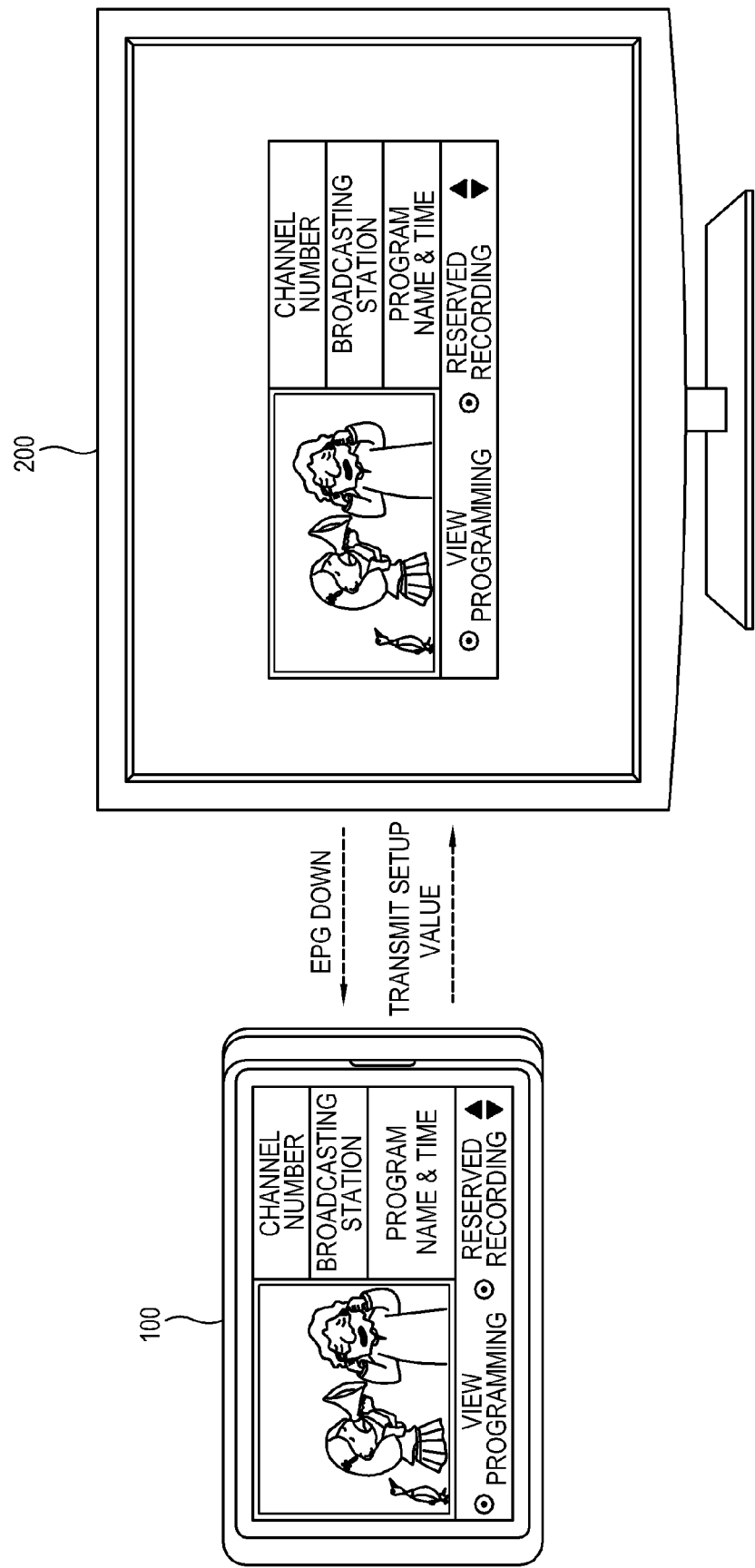
FIG. 5 illustrates an AV device including a broadcast receiving device and a mobile device receiving EPG information corresponding to the plurality of channels from the AV device according to an exemplary embodiment.

FIG. 5 illustrates an AV device 200 including a broadcast receiving device receiving a plurality of channels and a mobile device 100 receiving the EPG information corresponding to the plurality of channels from the AV device 200 according to an exemplary embodiment.

If an AV device 200 includes a broadcast receiving device receiving a plurality of channels, the AV device 200 receives the EPG information on the channels along with a broadcasting signal. In this case, the AV device 200 transmits the UI information to control the AV device 200 and the EPG information on the channels to a mobile device 100.

Alternatively, the mobile device 100 may download the EPG information on the channels independently via an external web server or the like.

When a user leaves the network area in which the AV device 200 is present with the mobile device 100 including information to control the AV device 200 and the EPG information on the channels, the user can search for the EPG information on the channels of the AV device 200 generated in the mobile device 100 and input a user setup value for view programming, reserved-recording, etc. through the EPG information using the mobile device 100 regardless of time and place. The input user setup value may be stored in the storage unit 140 of the mobile device 100.

When the user returns with the mobile device 100 to a network location where the AV device 200 is present, the communication unit 110 of the mobile device 100 may be connected to a wired network physically via a cable or to a wireless network via a wireless network connection manager. The controller 150 of the mobile device 100 transmits the stored user setup value to the AV device 200.

The controller 230 of the AV device 200 receives the user setup value and compares the user setup value with a preset value corresponding to a setup item stored in the storage unit 240. If the user setup value is different from the preset value, the signal processor 220 processes the user setup value to change a setup of the AV device, such as, for example, to change the setup of the view programming, reserved-recording, etc., in accordance with the user setup value.

Figure 6:
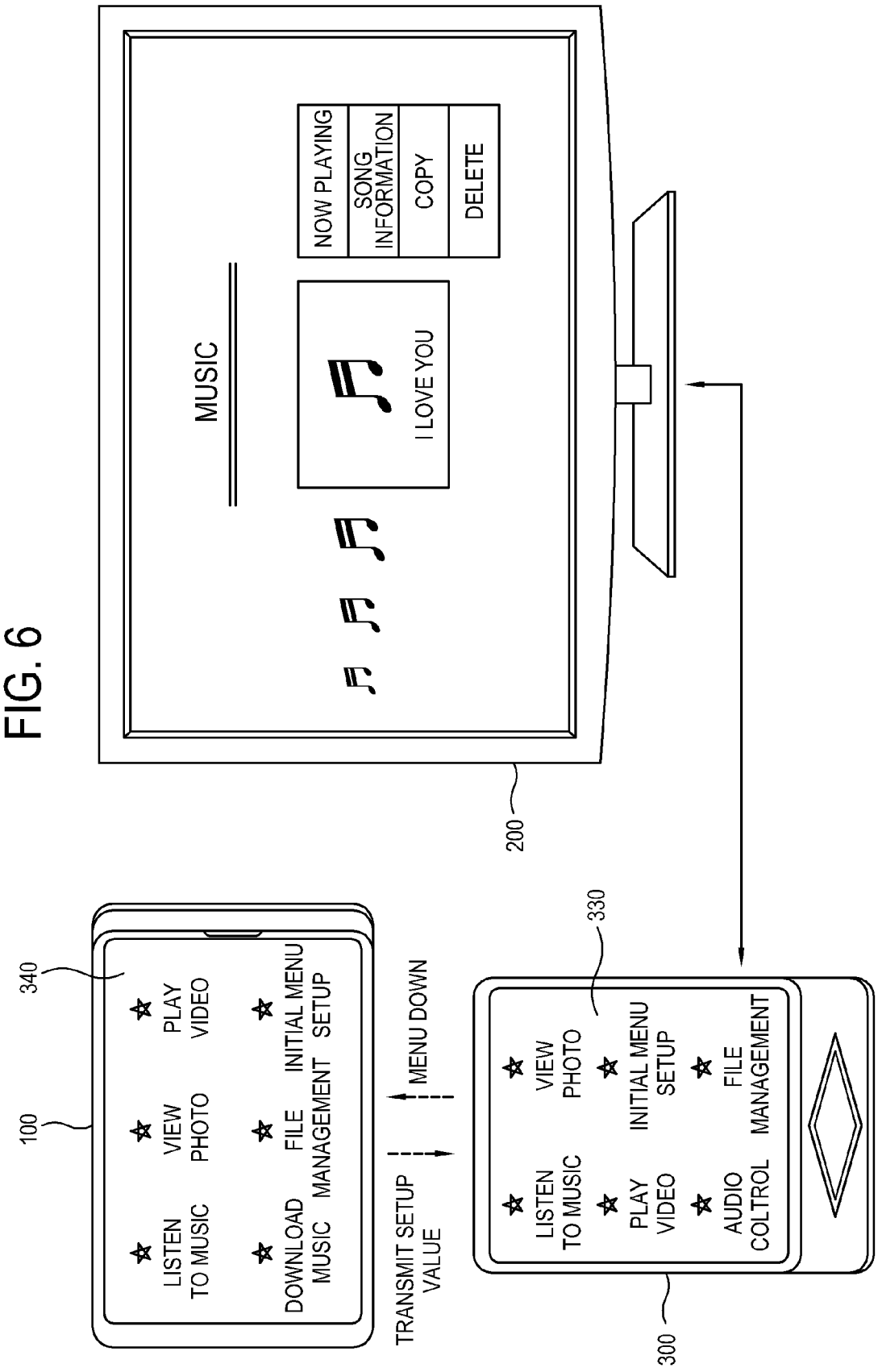
FIG. 6 illustrates an AV device including an MP3 player and a mobile device receiving UI information in accordance with an exemplary embodiment.

FIG. 6 illustrates a plurality of AV devices including an MP3 player 300. A mobile device 100 receives the UI information including a menu 330 of the MP3 player.

When a user leaves the network area with a mobile device 100 including the GUI 340 generated corresponding to the UI information displaying a menu 330 of the MP3 player, a user may input a user setup value for the reserved-transmission of the image and/or audio contents stored in the MP3 player 300 to the AV device 200 using the mobile device 100.

When the user returns to a network location where the MP3 player 300 and the AV device 200 are present, the communication unit 110 of the mobile device 100 may be connected to a cable network physically via a cable or to a wireless network via a wireless network connection manager. The controller 150 of the mobile device 100 transmits the stored user setup value to the MP3 player 300.

The MP3 player 300 receives the user setup value for the reserved-transmission and compares the user setup value with a corresponding preset value stored in the storage unit 240 of the MP3 player 300. As a result, if the user setup value (setup value for the reserved-transmission) is different from the preset value, the signal processor 220 of the MP3 player 300 processes the user setup value for the reserved-transmission so that the MP3 player 300 transmits contents to the AV device 200. Accordingly, if the contents are an audio file, the AV device 200 performs the contents using a listening-to-music function according to a user's choice.

Thus, the user inputs and stores the user setup values of a plurality of various AV devices using the mobile device 100 by generating the GUI corresponding to the UI menus of the various AV devices included in a home network regardless of time and place. A user setup value is transmitted to a corresponding AV device to control one or more AV device accordingly.

Figure 7:
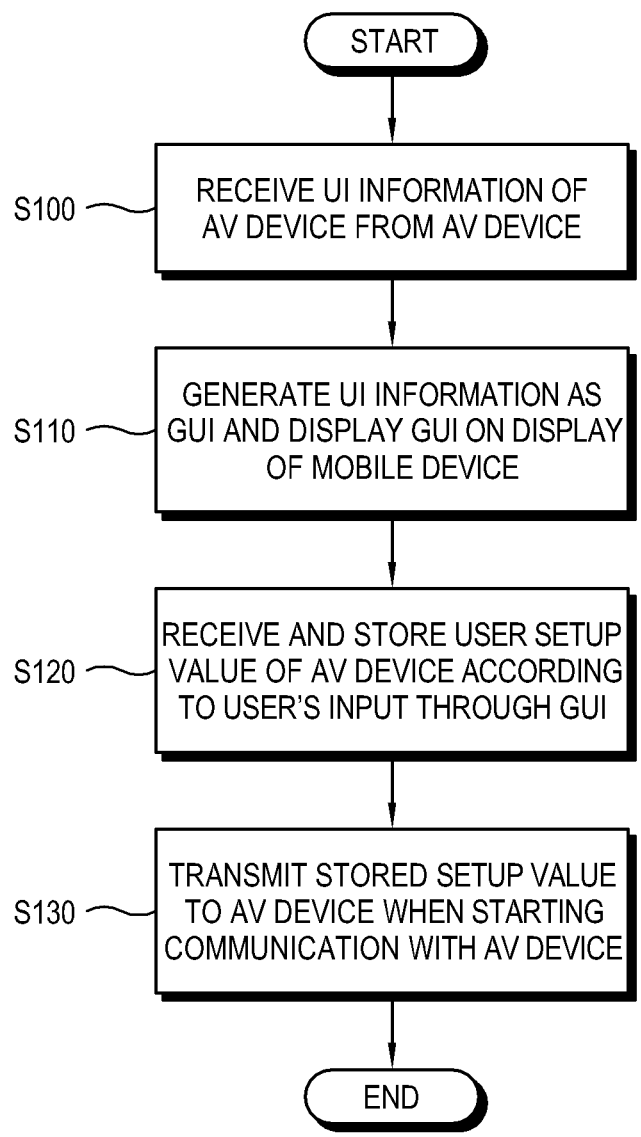
FIG. 7 is a flow chart illustrating a control process of a mobile device according to an exemplary embodiment.

FIG. 7 is a flow chart illustrating a control process of a mobile device 100 according to an exemplary embodiment.

The mobile device 100 which is capable of conducting network communications with an external AV device receives the UI information of the AV device from the AV device (S100). The mobile device 100 generates the UI information of the AV device 200 as a GUI and displays the GUI on a display 120 of the mobile device (S110). When receiving a user setup value of the AV device via the user's input through the GUI displayed on the display 120, the mobile device 100 stores the user setup value in a storage unit (S120). When starting network communication with the AV device, the mobile device 100 transmits the user setup value stored in the storage unit 140 to the AV device (S130).

Figure 8:
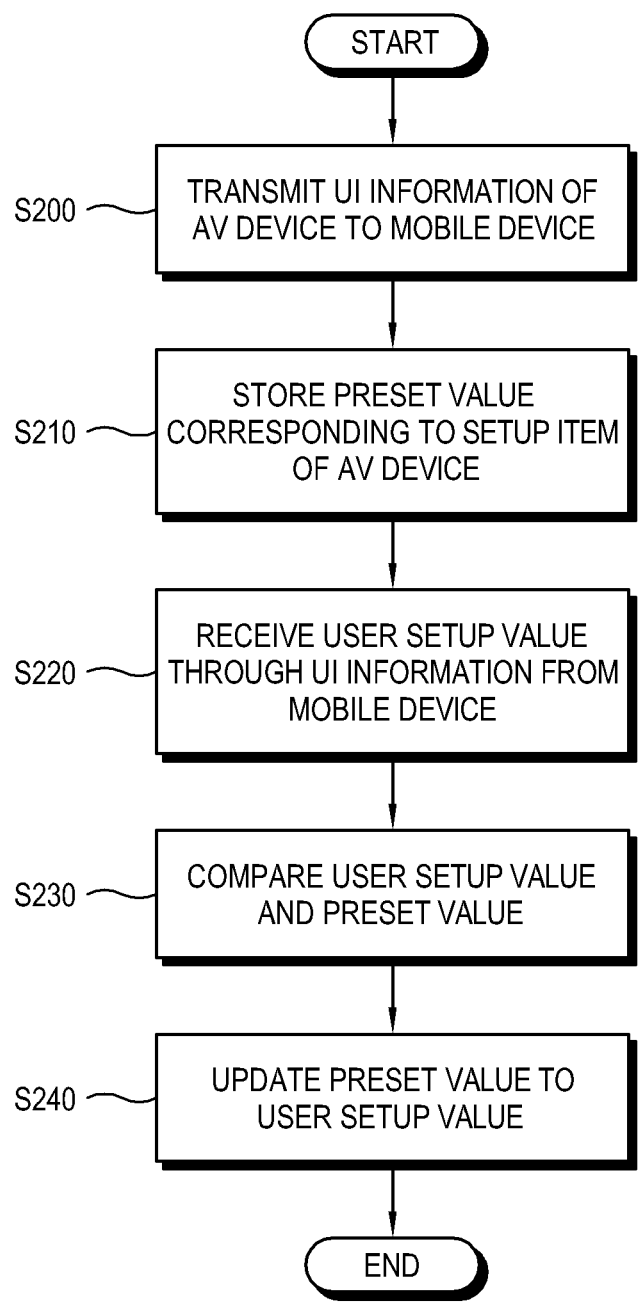
FIG. 8 is a flow chart illustrating a control process of an AV device according to an exemplary embodiment.

FIG. 8 is a flow chart illustrating a control process of an AV device 200 according to an exemplary embodiment.

The AV device 200 which is capable of conducting network communications with an external mobile device 100 transmits the UI information of the AV device to the mobile device 100 (S200). The AV device 200 stores a preset value of at least one setup item corresponding to the UI in a storage unit (S210).

When receiving a user setup value entered by a user through the GUI generated based on the UI information of the AV device 200 from the mobile device 100 (S220), the AV device compares the user setup value with the preset value corresponding to the setup item stored in the storage unit (S230). As a result, if the user setup value is different from the preset value, the AV device is updated with the user setup value to reflect the user setup value (S240).

An exemplary embodiment provides a method of controlling a mobile device and an AV device, as described above with reference to FIGS. 7 and 8.

The foregoing exemplary embodiments and advantages are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A mobile device comprising:
    a display;
    a user input receiving unit which receives an input of a user;
    a storage unit;
    a communication unit which communicates with an external audio/video (AV) device via a network; and
    a controller which receives user interface (UI) information of the AV device from the AV device through the communication unit to display the UI information on the display, controls the storage unit to store a user setup value of the AV device according to the input of the user entered using the UI information of the AV device on the mobile device regardless of whether the communication unit communicates with the AV device, and controls the communication unit to transmit the user setup value to the AV device when the communication unit starts communicating with the AV device,
    wherein the user setup value in the storage unit, which is stored when the mobile device is located outside a network area such that the communication unit is not connectable to the AV device, is automatically transmitted to the AV device by the controller if the mobile device returns within the network area such that the communication unit is connectable to the AV device.

2. The mobile device according to claim 1, wherein the controller receives the UI information about a setup menu of the AV device from the AV device.

3. The mobile device according to claim 2, wherein the setup menu comprises at least one of initial setup, image quality control, audio control, time setup, channel control, and media file management of the AV device.

4. The mobile device according to claim 1, wherein the AV device outputs an image and a sound based on a broadcasting signal having a plurality of channels, and the controller receives electronic programming guide (EPG) information about the plurality of channels along with the UI information of the AV device from the AV device.

5. The mobile device according to claim 1, wherein the display displays graphical user interface (GUI) generated based on the UI information received from the AV device.

6. The mobile device according to claim 1, wherein the mobile device receives the UI information of each of a plurality of AV devices from the plurality of AV devices.

7. An audio/video (AV) device controlled by a user interface (UI), the AV device comprising:
    a communication unit which communicates with an external mobile device via a network;
    a signal processor which processes a user setup value via the UI; and
    a controller which transmits UI information of the AV device to the mobile device through the communication unit, receives the user setup value, which is entered using the UI information of the AV device and stored in the mobile device regardless of whether the mobile device communicates with the AV device, from the mobile device when the communication unit starts communicating with the mobile device, and processes the user setup value,
    wherein the user setup value in the storage unit, which is stored when the mobile device is located outside a network area such that the communication unit is not connectable to the AV device, is automatically transmitted to the AV device by the controller if the mobile device returns within the network area such that the communication unit is connectable to the AV device.

8. The AV device according to claim 7, further comprising a storage unit which stores a preset value corresponding to at least one setup item, wherein the controller compares the user setup value received from the mobile device with the preset value of the at least one setup item stored in the storage unit and updates the preset value.

9. The AV device according to claim 7, further comprising a display and a signal receiving unit which receives a broadcasting signal having a plurality of channels, wherein the signal processor processes the broadcasting signal received by the signal receiving unit, and the controller controls the signal receiving unit to receive the broadcasting signal of one of the plurality of channels selected by an input of a user and controls the signal processor to process the received signal to be displayed on the display.

10. The AV device according to claim 9, wherein the controller transmits electronic programming guide (EPG) information about the plurality of channels along with the UI information of the AV device to the mobile device.

11. The AV device according to claim 10, wherein the UI information comprises UI information about a setup menu of the AV device.

12. The AV device according to claim 11, wherein the setup menu comprises at least one of initial setup, image quality control, audio control, time setup, channel control, and media file management of the AV device.

13. A method of controlling a mobile device which comprises a display and a communication unit configured to communicate with an external audio/video (AV) device via a network, the method comprising:
    receiving user interface (UI) information of the AV device from the AV device;
    generating the UI information as a graphical user interface (GUI) and displaying the GUI on the display;
    receiving a user setup value of the AV device according to an input of a user through the GUI and storing the user setup value of the AV device according to the input of the user entered using the UI information of the AV device on the mobile device in a storage unit regardless of whether the communication unit communicates with the AV device; and transmitting the user setup value of the AV device to the AV device when starting to communicate with the AV device through a communication unit, wherein the transmitting the user setup value comprises automatically transmitting the user setup value in the mobile device which is stored when the mobile device is located outside a network area such that the communication unit is not connectable to the AV device, to the AV device if the mobile device returns within the network area such that that the communication unit is connectable to the AV device.

14. A method of controlling an audio/video (AV) device comprising a communication unit which is configured to communicate with an external mobile device via a network, the method comprising:

transmitting user interface (UI) information of the AV device to the mobile device;

receiving a user setup value, which is entered using the UI information and stored in the mobile device regardless of whether the communication unit communicates with the AV device, from the mobile device when the communication unit starts communicating with the mobile device; and processing the user setup value, wherein the transmitting the user setup value comprises automatically transmitting the user setup value in the mobile device, which is stored when the mobile device is located outside a network area such that the communication unit is not connectable to the AV device, to the AV device if the mobile device returns within the network area such that the communication unit is connectable to the AV device.

15. The method according to claim 14, further comprising:

storing a preset value corresponding to at least one setup item in a storage unit; and comparing the user setup value with a preset value of the at least one setup item to correspond to the user setup value stored in the storage unit and updating the preset value.

16. A communication method comprising:

receiving, by a mobile device connected to a network, user interface (UI) information comprising a control menu of an audio/video (AV) device from the AV device connected to the network and disposed externally of the mobile device;

generating, by the mobile device, a graphical user interface (GUI) based on the received UI information to correspond to the control menu;

receiving a user setup value to control the AV device entered by a user through the generated GUI;

storing the user setup value of the AV device according to an input of the user entered using the UI information of the AV device in the mobile device regardless of whether the mobile device communicates with the AV device; and transmitting the user setup value to the AV device, wherein the transmitting the user setup value comprises automatically transmitting the user setup value in the mobile device, which is stored when the mobile device is located outside a network area such that the communication unit is not connectable to the AV device, to the AV device if the mobile device returns within the network area such that the communication unit is connectable to the AV device.

17. The communication method of claim 16, further comprising:

disconnecting the mobile device from the network prior to the receiving and the storing the user setup value;

detecting a connection of the mobile device to the network; and transmitting the stored user setup value to the AV device subsequent to the detecting the connection.

18. The communication method of claim 17, further comprising:

storing, in advance, a preset value of a setup item in the AV device;

receiving the stored user setup value by the AV device, subsequent to the detecting the connection;

comparing the received user setup value to the stored preset value;

updating the stored preset value based on the received user setup value based on the comparing; and setting up the AV device based on the received user setup value.

19. The communication method of claim 16, wherein the AV device comprises a plurality of AV devices comprising at least one of a television (TV), an MP3 player, and a DVD player.

20. The communication method of claim 19, wherein the receiving the UI information comprises:

receiving, by the mobile device, the UI information of each AV device from a corresponding AV device.

21. The communication method of claim 20, wherein the plurality of AV devices comprises at least one of the TV and the MP3 player, and the receiving further comprises respectively at least one of:

receiving electronic program guide (EPG) along with the UI information from the TV, and receiving the UI information comprising to a menu of the MP3 player.

22. An apparatus for use in a mobile device, the apparatus comprising:

a controller which receives user interface (UI) information of an external audio/video (AV) device to display the UI information, controls a storage unit to store a user setup value of the AV device according to an input of a user entered using the UI information of the external AV device on the mobile device regardless of whether the mobile device communicates with the AV device, and controls a transmission of the user setup value to the AV device, wherein the user setup value in the storage unit, which is stored when the mobile device is located outside a network area such that the mobile device is not connectable to the AV device, is automatically transmitted to the AV device by the controller if the mobile device returns within the network area such that the mobile device is connectable to the AV device.

23. The apparatus of claim 22, wherein the controller receives the UI information about a setup menu of the AV device sent from the AV device.

* * * * *